US009797793B1

(12) United States Patent
Przybyl et al.

(10) Patent No.: US 9,797,793 B1
(45) Date of Patent: Oct. 24, 2017

(54) METHODS AND SYSTEMS FOR PREDICTING MANIFOLD PRESSURE

(71) Applicant: Brunswick Corporation, Lake Forest, IL (US)

(72) Inventors: Andrew J. Przybyl, Berlin, WI (US); Steven J. Andrasko, Oshkosh, WI (US); Justin R. Poirier, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 261 days.

(21) Appl. No.: 14/698,184

(22) Filed: Apr. 28, 2015

(51) Int. Cl.
*G01L 7/00* (2006.01)
*F02D 9/02* (2006.01)
*F02M 65/00* (2006.01)
*F02D 17/04* (2006.01)

(52) U.S. Cl.
CPC .................. *G01L 7/00* (2013.01); *F02D 9/02* (2013.01); *F02D 17/04* (2013.01); *F02M 65/00* (2013.01)

(58) Field of Classification Search
CPC ..... F02D 2200/0402; F02D 2200/0404; F02D 2200/0406; F02D 2200/0408; F02D 2200/703; F02D 41/18; F02D 41/2422; F02D 17/04; F02D 9/02; G01L 7/00; F02M 65/00
USPC ................ 73/114.31, 114.32, 114.36, 114.37
See application file for complete search history.

(56) References Cited

U.S. PATENT DOCUMENTS

| | | | | |
|---|---|---|---|---|
| 3,963,670 | A | 6/1976 | Kalert et al. | |
| 4,337,742 | A | 7/1982 | Carlson et al. | |
| 4,452,201 | A | 6/1984 | Mazur et al. | |
| 5,019,799 | A * | 5/1991 | Oshiage | B60T 8/885 340/438 |
| 5,270,935 | A * | 12/1993 | Dudek | F02D 41/1401 123/480 |
| 5,497,329 | A * | 3/1996 | Tang | F02D 41/045 123/480 |
| 5,505,179 | A * | 4/1996 | Brennan | F02D 41/222 123/479 |
| 6,158,417 | A | 12/2000 | Rauch et al. | |
| 6,298,824 | B1 * | 10/2001 | Suhre | F02D 37/02 123/406.49 |
| 6,539,917 | B2 | 4/2003 | Shaw et al. | |
| 6,561,016 | B1 * | 5/2003 | Suhre | F02D 41/18 73/114.31 |
| 6,701,890 | B1 | 3/2004 | Suhre et al. | |
| 6,782,738 | B2 * | 8/2004 | Rouphael | G01M 15/09 73/114.33 |
| 6,834,637 | B1 | 12/2004 | Sharpton | |
| 7,000,589 | B2 * | 2/2006 | Matthews | F02D 9/02 123/350 |
| 7,027,905 | B1 * | 4/2006 | Mladenovic | F02D 41/18 701/102 |
| 2006/0191516 | A1 * | 8/2006 | Hasegawa | F02D 41/222 123/479 |

(Continued)

*Primary Examiner* — Natalie Huls
(74) *Attorney, Agent, or Firm* — Andrus Intellectual Property Law, LLP

(57) ABSTRACT

A method of predicting manifold air pressure in an internal combustion engine during idle comprising the steps of receiving an idle air control (IAC) duty cycle value from an idle air controller, receiving an atmospheric pressure, and predicting a manifold pressure in an engine control unit based on the IAC duty cycle value and the atmospheric pressure.

20 Claims, 6 Drawing Sheets

(56) References Cited

U.S. PATENT DOCUMENTS

2012/0323343 A1 * 12/2012 Grichnik ........... G05B 23/0235
700/30

* cited by examiner

METHODS AND SYSTEMS FOR PREDICTING MANIFOLD PRESSURE

FIELD

The present disclosure relates to internal combustion engines, such as engines for propelling marine vessels, and more specifically to systems and methods for controlling and providing air intake thereto at idle conditions.

BACKGROUND

U.S. Pat. No. 6,834,637 discloses an adapter for an air valve, such as an idle air control valve, has a rigid tubular member extending between a distal insertion end and an attachment pedestal end. The insertion member, or distal end, is rigidly attached to an air passage of a throttle body and an idle air control valve is rigidly attached to the attachment end. This allows an idle air control valve to be rigidly mounted to a throttle body while being displaced from the throttle body and held in a non contact association with the throttle body to allow different variations and styles of idle air control valve to be used with various types of throttle bodies.

U.S. Pat. No. 6,158,417 discloses a throttle body (61) has a first body part (62) containing an upstream portion of the through-bore (68) and a second body part (64) containing a downstream portion of the through-bore. The two body parts are joined together to register the downstream portion of the through-bore as a continuation of the upstream portion at respective confronting faces of the two body parts, capturing at least one bearing assembly (94) of a throttle mechanism between the confronting faces to thereby journal a throttle shaft (72) on opposite wall portions of the throttle body. The two body parts also contain a by-pass air passage (114). In one form (FIGS. 1 and 2) an idle air control valve (58) associates with the by-pass passage; in another (FIGS. 3 and 4), an electric motor actuator (167) associates with the passage and with the throttle shaft.

U.S. Pat. No. 4,452,201 discloses an auxiliary air by-pass actuator valve of small size is disclosed which provides a quick response to the changing RPM of the engine due to changing loads. The actuator employs a stationary D-shaped orifice in communication with a rotatable valve member and D-shaped disc to regulate the amount of auxiliary air which bypasses the throttle blade in an electronic fuel injection system.

U.S. Pat. No. 4,337,742 discloses an idle air control apparatus for a vehicle driving internal combustion engine having an air induction passage includes a control valve in the air induction passage controlled by a stepper motor in response to the arithmetic count of applied electrical pulses, a register effective to store a valve control number representing the currently desired position of the control valve, apparatus effective upon occurrence of a predetermined engine loading event to change the valve control number in response thereto, an up-down counter effective to arithmetically count the pulses applied to the stepper motor and thus indicate actual control valve position, a closed loop control effective to compare the contents of the up-down counter and register and apply pulses to the stepper motor at the first predetermined rate to reduce any difference therebetween and a speed trim loop active only during occurrence of a predetermined steady state idle condition to compare actual engine speed with the desired engine idle speed and arithmetically change the valve control number in the register at a second predetermined rate substantially slower than the first predetermined rate to reduce any difference between said speeds. Thus idle air control responds to large, sudden engine load changes and environmental factors to prevent engine stall but ignores small random speed fluctuations to maintain a stable engine idle.

U.S. Pat. No. 3,963,670 discloses a carburetor which includes a supplementary fuel/air supply circuit for bypassing a throttle valve to provide a fixed fuel/air idle mixture. The supplementary fuel/air supply circuit includes separate fuel and air passageways which join at a mixing intersection. The mixing intersection communicates with a main bore of the carburetor at a point below a throttle valve thereof. The supplementary fuel/air supply circuit also includes a piston valve, which is responsive to manifold vacuum, to control flow of air through the air passageway so that the air passageway is open during periods of high manifold vacuum but closed during periods of low manifold vacuum. An idle-mixture adjusting screw is provided for adjusting air flow through the air passageway; a piston-stop adjusting screw is provided for tuning the position of the piston valve at its "closed" position; and, in one embodiment, a special plug is provided for holding the piston valve in a piston chamber.

U.S. Pat. No. 6,561,016 discloses a method and apparatus for calculating the air charge mass for an engine as a function of four measured parameters. These parameters include the engine speed measured by a tachometer, a throttle position measured by a throttle position sensor, manifold air temperature, and barometric pressure. Without the need for a mass air flow sensor or a manifold absolute pressure sensor, the present invention provides a system for quickly and accurately calculating the air charge mass for the engine.

U.S. Pat. No. 6,298,824 discloses a control system for a fuel injected engine providing an engine control unit that receives signals from a throttle handle that is manually manipulated by an operator of a marine vessel. The engine control unit also measures engine speed and various other parameters, such as manifold absolute pressure, temperature, barometric pressure, and throttle position. The engine control unit controls the timing of fuel injectors and the injection system and also controls the position of a throttle plate. No direct connection is provided between a manually manipulated throttle handle and the throttle plate. All operating parameters are either calculated as a function of ambient conditions or determined by selecting parameters from matrices which allow the engine control unit to set the operating parameters a function of engine speed and torque demand, as presented by the position of the throttle handle.

The patents described above are hereby expressly incorporated by reference in the description of the present invention.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

A method of predicting manifold air pressure in an internal combustion engine during idle comprising the steps of receiving an idle air control (IAC) duty cycle value from an idle air controller, receiving an atmospheric pressure, and predicting a manifold pressure in an engine control unit based on the IAC duty cycle value and the atmospheric pressure.

One embodiment of a system for predicting manifold air pressure in an internal combustion engine comprises an idle air controller that determines the IAC duty cycle value and a manifold absolute pressure sensor that senses the manifold absolute pressure. The system further comprises an engine control unit that detects failure of the manifold absolute pressure sensor and then predicts manifold pressure based on the IAC duty cycle value and the atmospheric pressure.

BRIEF DESCRIPTION OF THE DRAWINGS

Examples are described with reference to the following figures. The same numbers are used throughout the figures to reference like features and like components.

DETAILED DESCRIPTION OF THE DRAWINGS

In the present description, certain terms have been used for brevity, clarity, and understanding. No unnecessary limitations are to be inferred therefrom beyond the requirement of the prior art because such terms are used for descriptive purposes only and are intended to be broadly construed. Each of the examples of systems and methods provided in the FIGURES and in the following description can be implemented separately, or in conjunction with one another and/or with other systems and methods.

Figure 1:
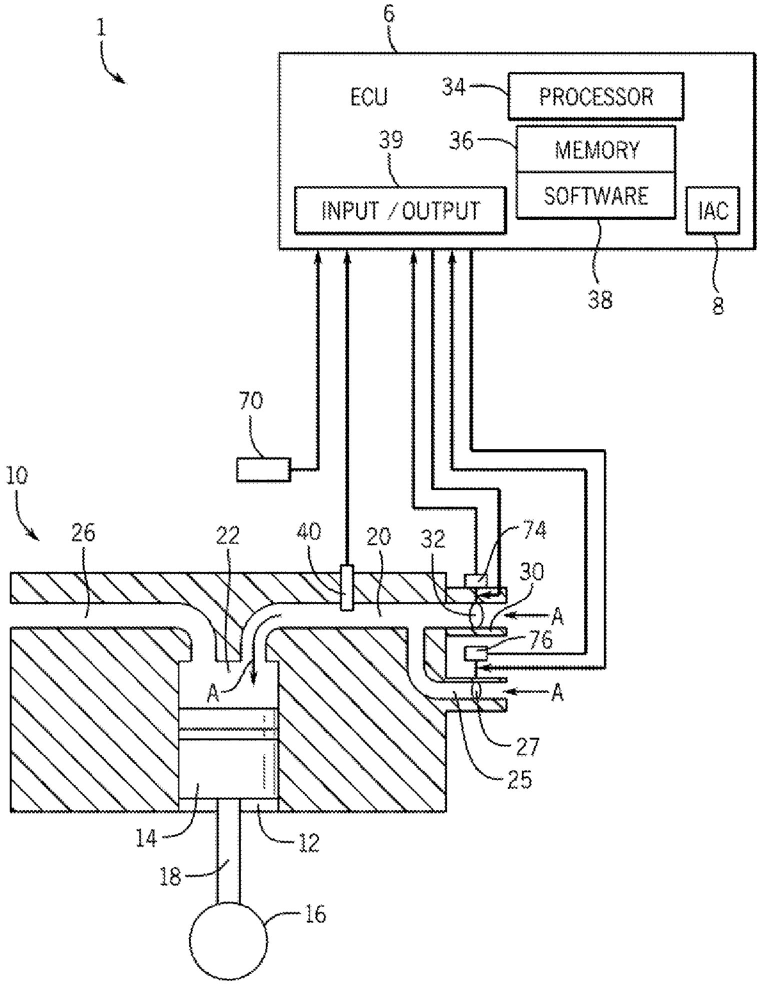
FIG. 1 is a schematic representation of a cross section of an internal combustion engine employing methods and systems disclosed herein.

FIG. 1 is a simplified cross sectional representation of an internal combustion engine 10 and a system for controlling intake air flow thereto. The engine 10 has a cylinder 12 in which a piston 14 is disposed for reciprocal movement. The piston 14 is connected to a crankshaft 16 by connecting rod 18. Air, represented by arrows A, flows into an intake manifold 20 which directs air into combustion chamber 22. The air A enters the intake manifold 20 either through the throttle valve 32 in the throttle body 30 or the idle air valve 27 in the idle air passage 25. The idle air passage 25 and idle air valve 27 are arranged to selectively direct outside air past the throttle valve 32 to supply air to the intake manifold 20 when the engine 10 is at idle. The idle air valve 27 may comprise a linear valve or a stepper motor to adjust the amount of air allowed to bypass the throttle valve 32 and enter the intake manifold 20.

The idle air valve 27 is generally controlled by an idle air controller 8. The idle air controller (IAC) 8 may be a subsystem of the engine control unit (ECU) 6, or it may be a separate controller with a distinct processor, software, and memory. For discussion purposes in the present application, the IAC 8 is described as a subsystem of the ECU 6; however, it should be recognized that this is a non-limiting example and the particular configurations of the ECU 6 and IAC 8 can vary from that which is shown and described. ECU 6 comprises a processor 34, an input/output device 39, memory 36, and software 38. The processor 34 loads and executes the software 38 from the memory 36. Executing the software 38 controls the system 1 to operate as described in further detail herein below. The processor 34 can comprise a microprocessor and/or other circuitry that receives and executes software 38 from memory 36. The ECU 6 can be implemented with a single processing device, or it can be distributed across multiple processing devices and/or subsystems that cooperate in storing and executing program instructions and data. The ECU 6 may include any number of general purpose central processing units, application-specific processors, and logic devices, as well as any other processing devices, combination of processing devices, and/or variations thereof. The ECU 6, and/or various parts thereof, can be located anywhere with respect to a vehicle, such as a marine vessel, and can communicate with various components of the system 1 via wired or wireless links.

The memory 36 can include any storage media that is readable by the processor 34 and capable of storing the software 38. The memory 36 can include volatile and/or nonvolatile, removable and/or non-removable media implemented in any method or technology for storage of information, such as computer readable instructions, data structures, program modules, or other data. The memory 36 can be implemented as a single storage device but may also be implemented across multiple storage devices or subsystems. The memory 36 can further include additional elements, such as a controller that is capable of communicating with the processor 34. Examples of storage media include random access memory, read only memory, magnetic discs, optical discs, flash memory discs, virtual and/or non-virtual memory, magnetic cassettes, magnetic tape, magnetic disc storage, or other magnetic storage devices, or any other medium which can be used to store the desired information and that may be accessed by an instruction execution system, as well as any combination or variation thereof, or any other type of storage media. In some implementations, the storage media can be a non-transitory storage media.

The input/output device(s) 39 associated with the ECU 6 can include any one of a variety of conventional computer input/output interfaces for receiving electrical signals for input to the processor and for sending electrical signals from the processor to various components of the system 1. The ECU 6, via the noted computer input/output device 39, communicates with the various sensor and valve components via one or more communication links, which may be wired or wireless links. As explained further herein below, the system 1 is capable of monitoring and controlling air delivery to the engine 10 by sending and/or receiving control signals via one or more of the links represented in FIG. 1. Although the links are each shown as a single link, the term "link" can encompass one or a plurality of links that connect between the ECU 6 and one or more of the components of the system 1.

The IAC 8 is configured to maintain the engine 10 at a certain idle speed, which in this disclosure is referred to as an "idle speed setpoint." The idle speed setpoint can be a calibrated engine speed value that typically is selected by the manufacturer through trial and error so as to avoid stalling of the engine 10 when, it is operated at idle speed and when it is shifted into forward and/or reverse gears. Other methods of selecting the idle speed setpoint are known in the art. The IAC 8 is configured to control one or more "combustion inputs" to the one or more combustion chambers 22 to thereby maintain the speed of the engine 10 at the noted idle speed setpoint. Examples of "combustion inputs" can include timing of ignition (i.e., spark provided by spark plugs), quantity and/or weight of fuel provided to the engine, spark energy, spark duration, injection timing, quantity and/or rate of air flow provided to the engine 10 via the idle air control valve 27, and/or the like. In certain examples, the IAC 8 may be a proportional integral derivative controller (PID), which calculates and monitors the rotational acceleration of the crankshaft 18 and how long that acceleration occurs. The IAC 8 is configured to compare the results of this calculation to one or more thresholds stored in the memory, and then modify the one or more of the noted combustion inputs accordingly to thereby maintain the engine 10 at the idle speed setpoint. It will be recognized by one having ordinary skill in the art that the type of IAC 8 can also vary from that which is shown and described.

The present application applies to engines, such as the engine 10 depicted in FIG. 1, having a separate idle air flow passage 25 that bypasses a mechanically driven throttle valve 32. Further, the present application applies to speed-density systems, which estimate air charge mass based on input from a manifold absolute pressure (MAP) sensor 40. The MAP sensor 40 measures the pressure within the intake manifold 20 and provides input to the ECU 6. Any type of manifold pressure sensor 46 capable of providing information to the ECU 20 representative of manifold absolute pressure can be used for this purpose.

The MAP sensor 40 may also provide an atmospheric pressure. The MAP sensor 40 may include a barometer to sense the atmospheric pressure, and thus may provide a manifold pressure and an atmospheric pressure to the ECU 6. Alternatively or additionally, the MAP sensor 40 may determine and provide atmospheric pressure by other means. For example, there are several instances where the pressure inside the intake manifold 20 is approximately equal to the outside atmospheric pressure, and thus the MAP sensor 40 measurements inside the intake manifold 20 may also serve as an atmospheric pressure measurement. For example, when the engine is not running or immediately upon power-up, the pressure inside the intake manifold is the same as the outside atmospheric pressure. Additionally, at full open throttle, i.e., when the throttle valve 32 is at or near its fully open position, the intake vacuum drops to almost zero and the pressure inside the intake manifold equals, or nearly equals, the outside atmospheric pressure. Alternatively or additionally, there may be a passage from the MAP sensor 40 to outside conditions that allows the MAP sensor 40 to measure outside atmospheric pressure. Accordingly, the MAP sensor 40 readings at those points may be used to determine atmospheric pressure. Alternatively or additionally, atmospheric pressure may be determined by a separate barometer 70 that senses the atmospheric pressure and provides that input to the engine control unit 6. Higher elevations have lower air pressure, and thus lower atmospheric and barometric pressure, than areas closer to sea level. Typically, atmospheric pressure at sea level is about 101 kPa or 30 inches of mercury (HG), and atmospheric pressure at 10,000 feet above sea level is about 72 kPa or 21 inches of mercury (HG), depending on location and climate conditions.

The ECU 6 may also be provided, with signal inputs from a throttle position sensor 74 and a tachometer 78 which measures engine speed. The throttle position sensor 74 senses a position of the throttle valve 32. The throttle position may be described as a percent of a maximum open position, where 0% throttle valve position corresponds to a neutral or closed position of the throttle valve 32 in which the motor is not applying torque to the throttle plate, and 100% throttle valve position corresponds to an open-most position at which maximum airflow is permitted through the throttle valve 32.

Ordinarily, the ECU 6 determines manifold pressure in the intake manifold 20 based on input from the MAP sensor 40. Based on the manifold absolute pressure from MAP sensor 40, the ECU 6 determines air flow calculations, i.e., how much air to allow into the intake manifold 20. Then, the ECU 6 determines fuel calculations based on those airflow calculations, i.e., how much fuel to inject into combustion chamber 22. Various embodiments of such air flow calculations are known to one of skill in the art, examples of which are provided at U.S. Pat. Nos. 6,561,016, 6,298,824, and 5,497.329, which have been incorporated by reference herein.

In order to maintain the engine at the idle speed setpoint, a specific amount of torque is required. Producing that amount of torque requires a certain combustion force, which is dependent on the amount of air and fuel available in the combustion chamber 22. The amount of air available for combustion is dependent in part on the atmospheric pressure, which is the pressure of the outside air that enter the intake manifold 20. Thus, at high altitudes where atmospheric pressure is low, a higher volume of air will need to be brought into the combustion chamber 22 in order to produce the same combustion force. Thus, as atmospheric pressure decreases, more air is let in through the throttle valve 32 and the idle air valve 27 to effectuate the same idle speed setpoint.

When a MAP sensor fails, an engine control unit needs to have alternative means of determining or predicting manifold pressure. Currently available control software predicts manifold pressure based on engine rpm and throttle position when the MAP sensor faults. For example, presently available control software and systems often utilize a lookup table comparing throttle position to engine rpm. Such tables provide manifold pressures at a range of engine rpms and positions of the throttle valve 32.

Through research and development related to idle air control, the inventors of the present application noticed that prior art control software was not able to maintain quality idle performance. Specifically, the inventors recognized that determining manifold pressure based on throttle position and engine rpm is insufficient at an idle state because such tables do not account for the effect on manifold pressure provided by the idle air valve 27, as well as other load factors that may be present during idle. For example, the engine may encounter varying loads during idle due to such factors as gear shifting and changes in oil temperature and friction as the engine warms up. Prior art control software is unable to account for such changes in air flow and load and thus provides inaccurate prediction of manifold pressure, resulting in undesired fueling characteristics.

Since mechanical throttled engines have an idle air controller that adjusts the manifold pressure while in an idle state, the present inventors realized that manifold pressure could be predicted based on the output of the IAC 8. Specifically, the manifold pressure may be gauged based on the idle air control (IAC) duty cycle, which is the percent of that idle air valve 27 is open in a range from completely closed to completely open. The present inventors also recognized that manifold pressure is also dependent upon atmospheric pressure. Accordingly, through research and development the present inventors recognized that a reliable and effective way of predicting manifold pressure when a MAP sensor 40 has failed is to do so based on IAC duty cycle and atmospheric pressure.

Figure 2:
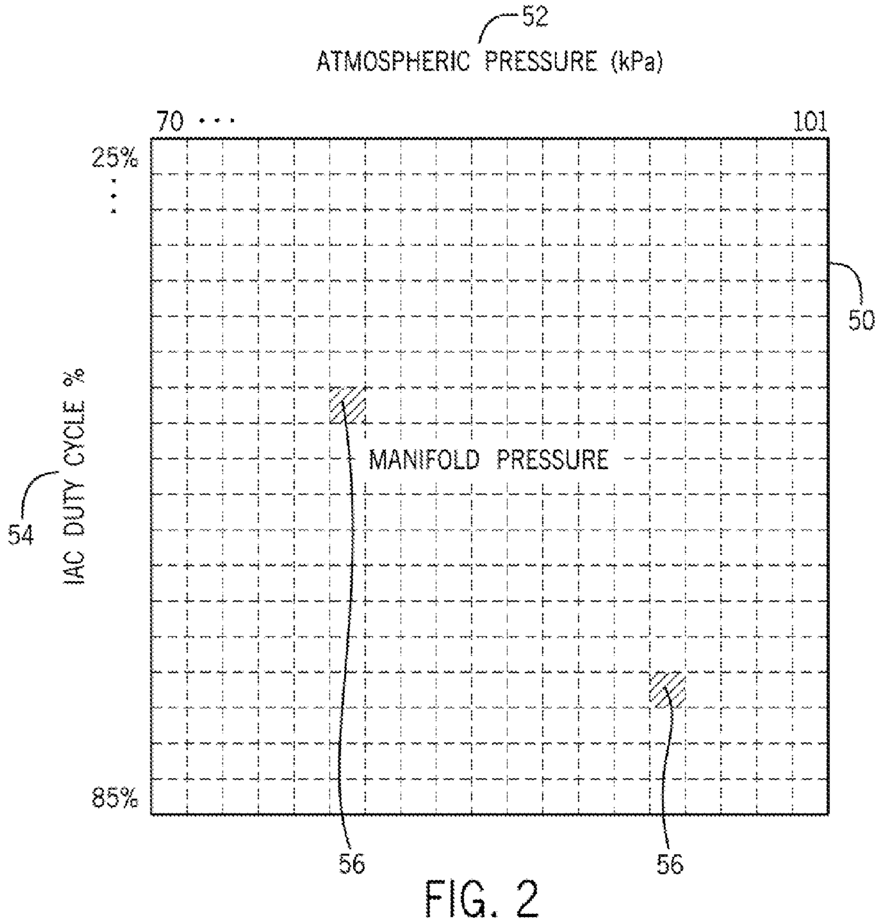
FIG. 2 is a representative table of manifold pressures for a range of atmospheric pressures and idle air control duty cycles.

In one embodiment, the ECU 6 is provided with a lookup table of manifold pressures at a range of IAC duty cycles and atmospheric pressures. FIG. 2 demonstrates an exemplary embodiment of such a table 50 of manifold pressure values 56. The vertical axis of the table 50 is provided based on IAC duty cycle percent 54 and the horizontal axis is provided based on atmospheric pressure 52 in kilopascals (kPa). In the exemplary embodiment of FIG. 2, the manifold pressure values 56 are provided for a range of IAC duty cycle percents 54 ranging from 25% to 85%. In other embodiments, this range could include any subset of values between fully closed and fully open—i.e., between 0% and 100%. The manifold pressures 56 are also provided for a range of atmospheric pressures 52 ranging from 70 kPa, which is an approximate atmospheric pressure for an elevation of around 10,000 feet above sea level, to 101 kPa, which is an approximate atmospheric pressure at sea level. In other embodiments, this could be any range of atmospheric pressures, which may be ranges including atmospheric pressures above and/or below the pressures of the example. It will be known to one of ordinary skill in the art that the exemplary table 50 of FIG. 2 can be arranged differently, such as providing IAC duty cycle percent 54 horizontally and atmospheric pressure 52 on the vertical axis, and that the manifold pressure values 56 may be provided at differing IAC duty cycle values 54 and atmospheric pressure values 52. Various idle air control systems may optimally operate at different duty cycle percents, depending on their configuration. For example, an alternative idle air control system may operate in the duty cycle percent range between 40% and 90%, or between 50% and 100%, or any other range falling between or including 0% to 100%.

A lookup table, such as that exemplified by FIG. 2, may be utilized by the ECU 6 when the engine is at idle and thus the idle air system is active. In one embodiment, the ECU 6 may determine that the engine is at idle and activate the IAC 8 based on the position of the throttle valve 32. For example, the ECU 6 may activate the IAC 8, and thus utilize the table 50 to predict manifold pressure, when the throttle valve 32 is less than 2% open. In alternative embodiments, the ECU 6 may activate the IAC 8 when the engine rpm falls below a particular threshold, such as below 1,000 rpm.

In general, the values in the table 50 provide that as the atmospheric pressure 52 increases and as the IAC duty cycle 54 decreases, the predicted manifold pressure 56 decreases. in other words, the manifold pressures 56 generally decrease as one moves diagonally across the table from the lower left hand corner to the upper right hand corner. Likewise, generally speaking, as the atmospheric pressure 52 increases and the IAC duty cycle 54 also increases, the manifold pressure value 56 will increase as well. Further, at any given atmospheric pressure 52, as the IAC duty cycle 54 increases, the predicted manifold pressure also increases. While these relationships generally describe the values across the table, small regions within the table may exist where these relationships are not true. For example, a small change in IAC duty cycle percent 54 and/or atmospheric pressure 52 may not produce any change in a corresponding manifold pressure value 56.

The table of FIG. 2 provides an improved prediction of manifold pressure 56 from prior art methods and systems because it accounts for atmospheric pressure 52 and because it is based on IAC duty cycle 54, which accounts for important load factors. In the table 50, manifold pressures 56 are provided for every index location on the table. Thus, for any given IAC duty cycle percent 54 and atmospheric pressure 52, a manifold pressure 56 can be accessed. The manifold pressure values 56 in the table 50 can be empirically determined, i.e., by measuring manifold pressure in the intake manifold 20 at the range of IAC duty cycle percents 54 and atmospheric pressures 52. Additionally, the table 50 of manifold pressure values 56 may be adjusted and optimized to produce desired performance qualities. For example, the manifold pressure values 56 in the table 50 may be optimized to provide desired fueling characteristics, which may be determined experimentally.

In another embodiment, an empirical equation may be generated based on the empirically-determined manifold pressure values that best describes or approximates those values for the range of IAC duty cycles and atmospheric pressures. In such an embodiment, mass flow rate equations would be generated, including calculation of discharge coefficients, to characterize the air flow in the intake manifold 20 based on the measured manifold pressure values at the range of IAC duty cycle values and atmospheric pressures. Alternatively, one of skill in the art will understand that volumetric flow equations may be generated to characterize the air flow in the intake manifold 20 based on the measured manifold pressure values at a range of volumetric flow rates and atmospheric pressures. In such an embodiment, the volumetric flow rate would be determined based on the IAC duty cycle, for example via a lookup table. In one possible embodiment, the empirical equation may be a first order linear equation that approximates the measured manifold pressure values. A first order linear equation may be desirable because it minimizes the processing power and time utilized by the ECU 6 in calculating manifold pressure; however, for some purposes a first order linear approximation will not describe the manifold pressure accurately enough to allow for sufficiently good fueling characteristics. In other embodiments, the manifold pressure values may be approximated with higher order empirical equations.

Figure 3:
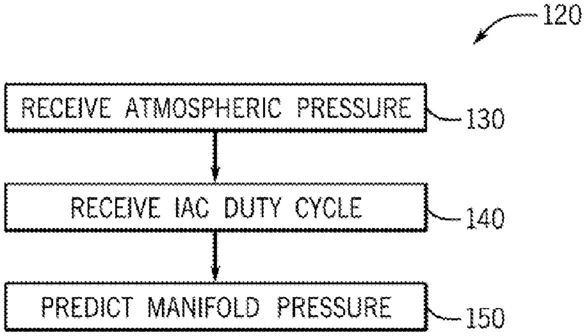
FIG. 3 is a flow chart depicting one embodiment of a method of predicting manifold air pressure.
Figure 4:
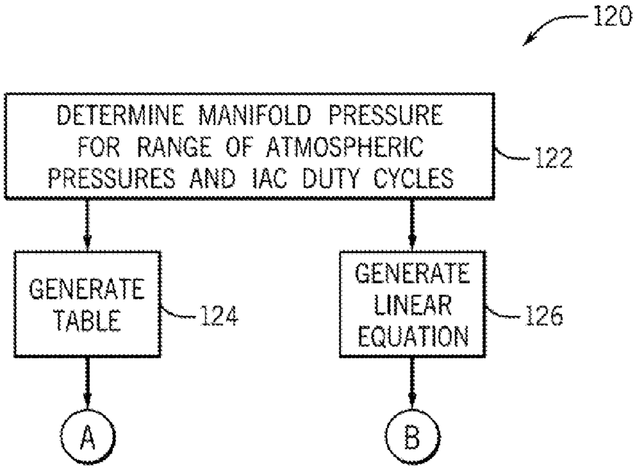
FIG. 4 is a flow chart depicting another embodiment of a method of predicting manifold air pressure.

FIG. 3 provides an embodiment of a method 120 of predicting manifold pressure in an internal combustion engine during idle, including receiving an atmospheric pressure at step 130 and receiving an IAC duty cycle from an idle air controller 8 at step 140. At step 150, the ECU 6 predicts manifold pressure based on the received atmospheric pressure and IAC duty cycle value. FIG. 4 depicts additional aspects of a method 120 of predicting manifold air pressure. At step 122, manifold pressures are determined for a range of atmospheric pressures and IAC duty cycles. For example, such manifold pressure values may be determined empirically and optimized as described above. Then, based on the manifold pressures determined at step 122, a table of manifold pressures may be produced at step 124 for the range of atmospheric pressures and IAC duty cycles. Alternatively or additionally, an empirical equation may be generated at step 126 which describes or approximates the manifold pressure values determined at step 122. As provided above, the empirical equation may be a mass flow equation that provides manifold pressure based on the IAC duty cycle and the atmospheric pressure, or it may be a volumetric flow equation that provides manifold pressure based on volumetric flow rate and atmospheric pressure. It should be understood that steps 124 and 126 are presented in the alternative, and only one or the other steps need to be executed in order to predict manifold pressure according to the present disclosure. If a table is generated at step 124, the ECU 6 predicts manifold pressure by utilizing that table, such as by executing the method steps described in FIG. 5. If an empirical equation is generated at step 126, the manifold pressure is predicted by utilizing that empirical equation, such as by executing the method steps described in FIG. 6A or 6B.

Figure 5:
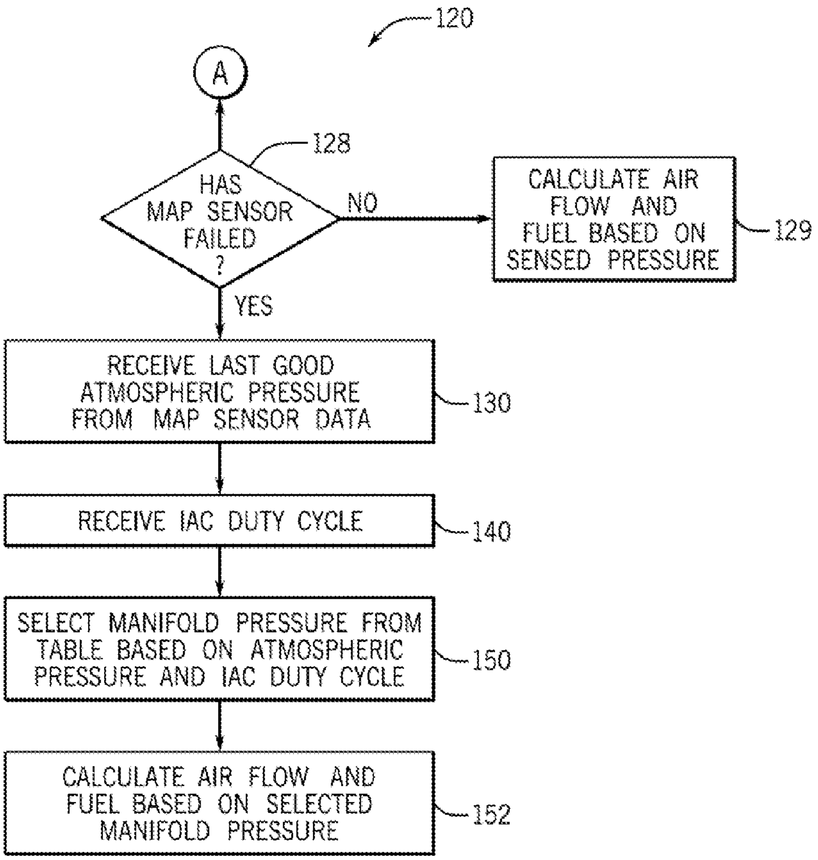
FIG. 5 is a flow chart depicting another embodiment of a method of predicting manifold air pressure.

FIG. 5 depicts a method of predicting manifold air pressure which follows from the generation of a table at step 124. At step 128, the ECU 6 determines whether the MAP sensor has failed. If the MAP sensor has not failed, the ECU 6 calculates air flow and fuel at step 129 based on manifold absolute pressure sensed by the MAP sensor 40. If it is determined at step 128 that the MAP sensor has failed, then the ECU continues to step 130 where it receives the last good atmospheric pressure determined from the manifold absolute pressure data gathered by the MAP sensor 40 prior to its failure. In accordance with embodiments described above, the ECU 6 may alternatively receive an atmospheric pressure from a backup pressure sensor, such as barometer 70. At step 140, the ECU 6 receives the IAC duty cycle, for example from the idle air controller 8. At step 150, the ECU 6 accesses a manifold pressure table and selects a manifold pressure based on the atmospheric pressure and the IAC duty cycle value. The ECU 6 then calculates an air flow and fuel amount at step 152 based on the selected manifold pressure.

Figure 6A:
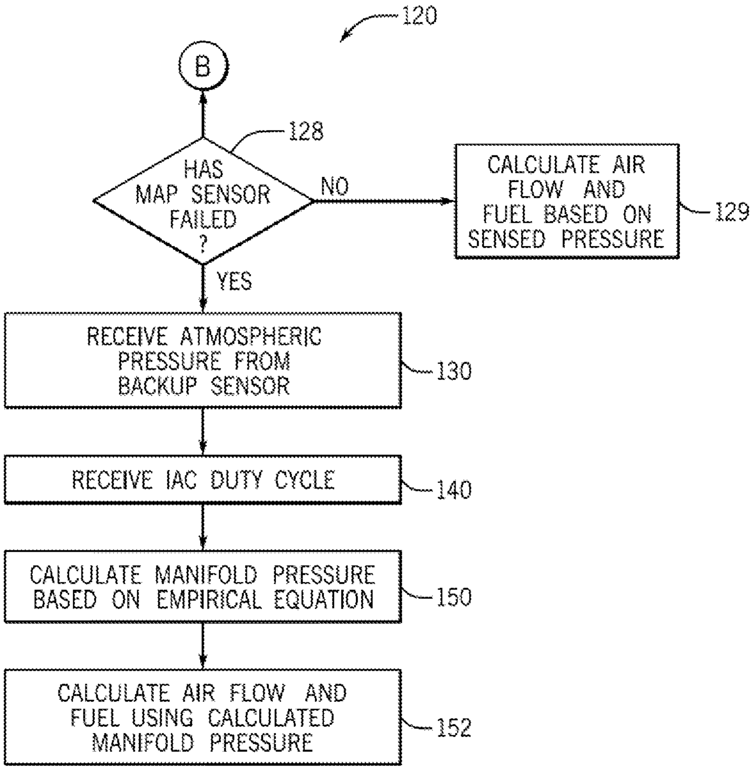
FIGS. 6A and 6B are flow charts depicting other embodiments of a method of predicting manifold air pressure.
Figure 6B:
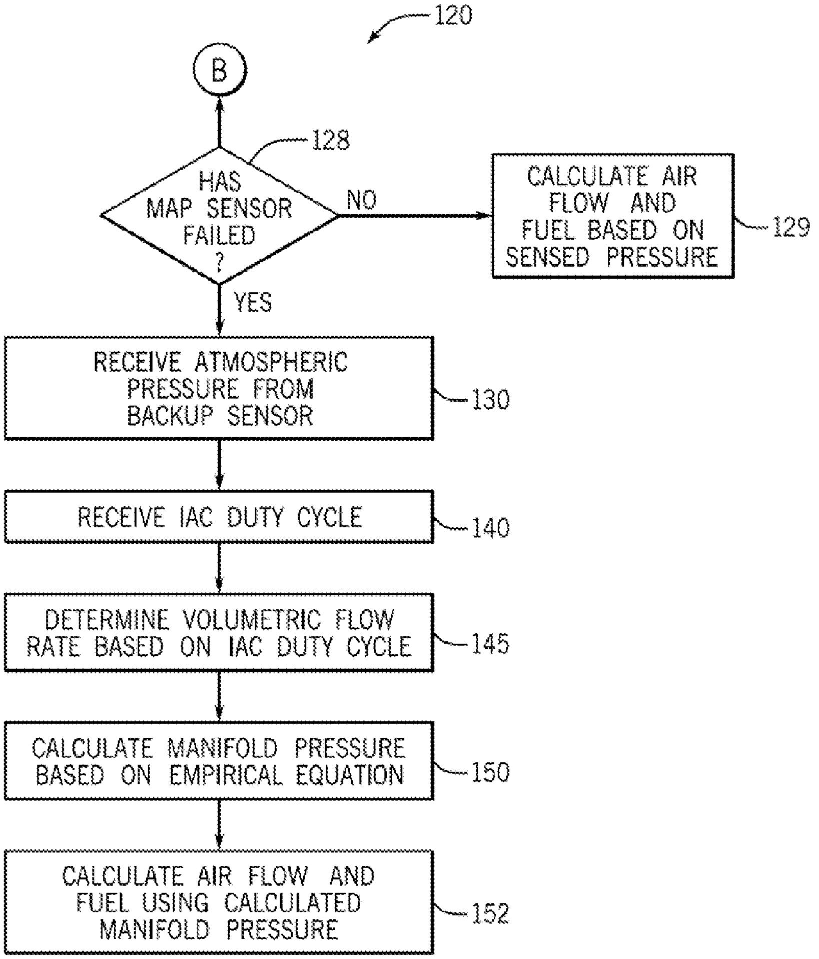

FIGS. 6A and 6B depict other aspects of an exemplary method of predicting manifold air pressure which continues from the generation of an empirical equation at step 126. At step 128 in both FIGS. 6A and 6B, the ECU 6 determines whether the MAP sensor has failed. If the MAP sensor has not failed, the ECU 6 executes step 129 as explained above. Alternatively, if the MAP sensor has failed, the ECU 6 receives an atmospheric pressure, such as from a backup pressure sensor, at step 130. At step 140 in both FIGURES, the IAC duty cycle is received. In FIG. 6A, the ECU 6 calculates manifold pressure at step 150 utilizing the empirical equation generated at step 126 and the received atmospheric pressure and IAC duty cycle values. In FIG. 618, the ECU 6 determines a volumetric flow rate at step 145 based on the IAC duty cycle, for example via a lookup table. The ECU 6 then calculates manifold pressure at step 150 utilizing the empirical equation generated at step 126, the atmospheric pressure received at step 130, and the volumetric flow rate determined at step 145. Finally, at step 152 in both FIGURES, the ECU 6 calculates air flow and fuel amount using the calculated manifold pressure.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and assemblies described herein may be used alone or in combination with other systems and assemblies. It is to be expected that various equivalents, alternatives and modifications are possible within the scope of the appended claims.

What is claimed is:

1. A method of predicting manifold air pressure in an internal combustion engine during idle, the method comprising:
- receiving an idle air control (IAC) duty cycle value from an idle air controller;
- receiving a atmospheric pressure;
- predicting, using an engine control unit, a manifold pressure based on the IAC duty cycle value and the atmospheric pressure; and
- controlling a fuel injection based on the predicted manifold pressure.

2. The method of claim 1 further comprising generating a table of manifold pressures for a range of IAC duty cycle values and atmospheric pressures, and wherein the step of predicting manifold pressure includes accessing the table of manifold pressures based on the received IAC duty cycle value and the atmospheric pressure.

3. The method of claim 2 wherein the table includes atmospheric pressure values at altitudes ranging from sea level to 10,000 feet above sea level.

4. The method of claim 3 wherein the table includes manifold pressures for IAC duty cycle values ranging from 25 percent to 85 percent.

5. The method of claim 2 further comprising generating the manifold pressures in the table by measuring manifold pressures at the range of IAC duty cycles and atmospheric pressures.

6. The method of claim 5 further comprising generating the manifold pressures in the table by adjusting the measured manifold pressure values to produce desired fueling outcomes.

7. The method of claim 1 further comprising detecting failure of a manifold absolute pressure sensor prior to executing the step of predicting the manifold pressure.

8. The method of claim 7 wherein the step of receiving the atmospheric pressure comprises receiving a pressure sensed by the manifold absolute pressure sensor before the failure.

9. The method of claim 7 wherein the step of receiving atmospheric pressure comprises receiving a pressure from a sensor other than the manifold absolute pressure sensor.

10. The method of claim 1 further comprising generating an empirical equation to describe manifold pressure for a range of IAC duty cycle values and atmospheric pressures, wherein the step of predicting manifold pressure includes calculating manifold pressure from the empirical equation using the IAC duty cycle value and the atmospheric pressure.

11. The method of claim 1 further comprising:
- generating an empirical equation to describe manifold pressure for a range of volumetric flow rates and atmospheric pressures;
- determining volumetric flow rate based on the IAC duty cycle value;
- wherein the step of predicting manifold pressure includes calculating manifold pressure from the empirical equation using the volumetric flow rate and the atmospheric pressure.

12. A system for predicting manifold air pressure in an internal combustion engine, the system comprising:
- an idle air controller that determines an IAC duty cycle value;
- a manifold absolute pressure sensor that senses a manifold absolute pressure; and
  - an engine control unit that detects failure of the manifold absolute pressure sensor, then predicts manifold pressure based on the IAC duty cycle value and an atmospheric pressure and controls a fuel injection based on the predicted manifold pressure.

13. The system of claim 12 wherein the engine control unit predicts manifold pressure based on a table of manifold pressures for a range of IAC duty cycle values and atmospheric pressures.

14. The system of claim 13 wherein the table includes atmospheric pressure values at altitudes ranging from sea level to 10,000 feet above sea level.

15. The method of claim 14 wherein the table includes manifold pressures for IAC duty cycle values ranging from 25 percent to 85 percent.

16. The system of claim 12 wherein the atmospheric pressure is determined based on a pressure sensed by the manifold absolute pressure sensor before the failure.

17. The system of claim 12 wherein the engine control unit predicts manifold pressure based on the atmospheric pressure from a barometric pressure sensor other than the failed manifold absolute pressure sensor.

18. The system of claim 12 wherein the engine control unit predicts manifold pressure based on the IAC duty cycle value and the atmospheric pressure when the internal combustion engine is at idle.

19. The system of claim 18 wherein the engine control unit determines that the engine is at idle based on the position of a throttle valve.

20. The system of claim 12 wherein as the atmospheric pressure increases and the IAC duty cycle decreases, the predicted manifold pressure decreases.

* * * * *